United States Patent [19]

Rudy

[11] Patent Number: 5,365,816

[45] Date of Patent: Nov. 22, 1994

[54] BEAM CUTTER

[75] Inventor: Norman A. Rudy, Renton, Wash.

[73] Assignee: Design Systems, Inc., Redmond, Wash.

[21] Appl. No.: 80,913

[22] Filed: Jun. 22, 1993

[51] Int. Cl.$^5$ .............................................. B26F 1/26
[52] U.S. Cl. ........................................ 83/177; 83/428; 83/618; 83/636
[58] Field of Search ................ 83/177, 53, 428, 618, 83/615, 636

[56] References Cited

U.S. PATENT DOCUMENTS

| | | | |
|---|---|---|---|
| 3,950,189 | 4/1976 | Lange et al. | 83/428 X |
| 4,246,838 | 1/1981 | Pulver et al. | |
| 4,266,112 | 5/1981 | Niedermeyer | |
| 4,735,566 | 4/1988 | Squicciarini | |
| 4,790,224 | 12/1988 | Krutilla et al. | |
| 4,875,254 | 10/1989 | Rudy et al. | |
| 4,876,934 | 10/1989 | Fagan et al. | 83/53 X |
| 4,931,140 | 6/1990 | Peltola et al. | 83/428 X |
| 5,083,487 | 1/1992 | Croteau | |

OTHER PUBLICATIONS

"Water 'laser' cuts food products without dust, noise or maintenance", *Food Engineering*, Jul. 1982, p. 99.

*Primary Examiner*—Rinaldi I. Rada
*Attorney, Agent, or Firm*—Christensen, O'Connor, Johnson & Kindness

[57] ABSTRACT

An apparatus and method for cutting a predetermined repetitive pattern in at least one piece of material (14). The apparatus includes a conveyor belt (12) for advancing the material (14) to be cut. A first drive mechanism, disposed above the conveyor belt, includes an endless belt (28) trained over two spindles (30, 32) powered by a servomotor (34). To reciprocate in a direction transversely to the direction of movement of the conveyor belt, at least one fluid jet cutter (16) is attached to the forward span of the drive belt (28) so as to move with the forward span of the drive belt. Correspondingly, at least one fluid jet cutter (18) is attached to the rearward span of the drive belt so as to move with the rearward span of the drive belt (28). The fluid jet cutters are carried by carriages (20, 22) which ride along tracks disposed adjacent and substantially parallel to the drive belt. A second drive mechanism (19b) with a second set of jet cutters (16b, 18b) and a second belt (28b) may be employed to cut complicated shapes. The present invention is used to cut shapes such as circles and pie segments by having the forward cutter and a rearward cutter attached to the opposite runs of the same belt to simultaneously cut mirror images of the circles or pie segments.

19 Claims, 11 Drawing Sheets

BEAM CUTTER

FIELD OF THE INVENTION

This invention relates generally to beam cutters, and more particularly, to a food cutter and method using beam cutters attached to an endless drive belt to cut circles and wedge shapes.

BACKGROUND OF THE INVENTION

Water jets have been used to cut food products for years. The advantages are numerous: there are no blades that need to be sharpened or replaced, no dust is created, and cuts can be quick and clean. The cutting is done with a thin, high pressure, high velocity stream of water or other fluid. Pressurized water is ejected from a very small orifice to create the jet. When the product touches this jet, a thin slice is removed without any appreciable water being absorbed into the product.

Shapes can be cut with one pass of the product beneath the water jets. Circular or pie shapes are often desired. These shapes require more than one fluid jet if the product to be cut is on a conveyor belt running in one direction as may be desirable. Since at least two jets must be used, they must be precisely coordinated to accurately produce the desired shape.

Various ways have been taught to move the water jets relative to the product to be cut. U.S. Pat. No. 4,266,112 (Niedermeyer) teaches the use of a conveyor belt on which the product is moved while jets mounted on solid frames move transversely to the direction of travel of the conveyor belt to cut different shapes. All cutters on the frame move in the same direction. Movement of the frames is accomplished with a complicated sliding arrangement, such as that illustrated in FIG. 10.

Niedermeyer also discloses an embodiment that uses a continuous chain with a cutter attached to one side. See FIG. 12. The cutter is actually linked into the chain such that the length must be adjusted by placing an idler on one side of the chain if additional cutters are added. No mention is made of any cutters being placed on more than one side of the chain. The disclosure states that this embodiment is to be used to make transverse cuts (see col. 9, line 63 through col. 10, line 49).

U.S. Pat. No. 4,735,566 (Squicciarini) discloses the general concept of using a fluid jet to transversely cut a ribbon of extruded dough that moves past the fluid jet on a conveyor. However, no other shapes are suggested.

U.S. Pat. No. 5,083,487 (Croteau) discloses a plurality of water jet cutters displaceable laterally and independently to cut shapes in a moving web (see FIGS. 5a-f). The cutters are each driven by their own belt, therefore, precise synchronization between the independent belt drives is required if particular shapes are desired that require two jets to work together.

The devices currently in use, as exemplified by those described above, do not effectively and efficiently solve the problem of cutting special shapes such as circles and pie segments without excess complexity and precise positioning of the water jets. Accordingly, the present invention was developed, and provides significant advantages over previous devices or methods to cut shapes with fluid jets.

SUMMARY OF THE INVENTION

Precise synchronization of the cutting device of the present invention is facilitated by the arrangement of the cutters on opposite sides of the same endless belt. Circles, pie segments and other complex shapes may be easily and accurately cut.

An apparatus for cutting a predetermined repetitive pattern in a moving strip, web, or piece of material is disclosed. The apparatus includes a frame, a conveyor belt, a first drive mechanism, and first and second beam cutters. The conveyor belt is movably mounted on the frame and advances the material on the belt. The first drive mechanism is also mounted on the frame to cross over the top of the conveyor belt. The first drive mechanism includes two spindles and a first endless drive belt trained on the spindles. The drive belt moves relative to the frame in a direction transverse to the direction of movement of the conveyor belt. The first drive belt has a forward span and a rearward span on opposite sides of the spindles. The first beam cutter is attached to the forward span of the first drive belt so as to move with the forward span of that belt. The second beam cutter is attached to the rearward span of the first drive belt so as to move with that span of the belt.

In a preferred embodiment of the invention the apparatus further includes first and second tracks, and first and second carriages. The first track is disposed adjacent and substantially parallel to the forward span of the first drive belt. The first carriage is attached to the forward span of the first drive belt and rides on the first track. The first carriage carries the first beam cutter. The second track is disposed adjacent and substantially parallel to the rearward span of the first drive belt. The second carriage is attached to the rearward span of the first drive belt and rides on the second track. The second carriage carries the second beam cutter. A drive system is provided for moving the first drive belt, along with the attached first and second carriages and the first and second beam cutters. Preferably, the drive system includes a servomotor that drives one of the spindles coupled to the drive belt. The second spindle is then utilized as an idler spindle.

In a further aspect of the preferred embodiment of the invention the beam cutters comprise fluid jet cutters and the embodiment includes first and second high-pressure fluid lines attached to the first and second fluid jet cutters, respectively, An alternate preferred embodiment of the invention includes third and fourth beam cutters attached to the forward and rearward spans of the first drive belt, respectively. The third beam cutter moves with the forward span of the first drive belt and the fourth beam cutter moves with the rearward span of the first drive belt. Preferably, in this embodiment, the third beam cutter is attached to the forward span of the first drive belt through an attachment to the first carriage. The third beam cutter is disposed adjacent to the first beam cutter. Likewise, the fourth beam cutter is attached to the rearward span of the first drive belt through an attachment to the second carriage, this cutter being disposed adjacent to the second beam cutter.

In another alternate embodiment of the invention, third and fourth carriages are provided. The third carriage is attached to the forward span of the first drive belt and rides on the first track. This third carriage carries the third beam cutter separate from the first carriage. The fourth carriage is likewise attached to the rearward span of the first drive belt and rides on to the second track. This fourth carriage carries the fourth beam cutter separate from the second carriage.

Another aspect of an alternate embodiment of the invention further includes a second drive mechanism, similar to the first, mounted on the frame above the conveyor belt. This second drive mechanism is disposed adjacent to the first drive mechanism and includes a second endless drive belt that moves transversely to the direction of movement of the conveyor belt. The second drive belt includes fifth and sixth beam cutters attached to the forward and rearward spans of the second drive belt, respectively. The fifth beam cutter moves with the forward span of the second drive belt and the sixth beam cutter moves with the rearward span of the second drive belt.

A method consistent with the apparatus described above is also provided. The method is drawn to a series of steps for cutting shapes in at least one piece of material with the beam cutters. The steps include: (a) supporting the material on a flat plane defined by the conveyor belt; (b) moving the material in a first direction; (c) generating beam cutter streams by forward and rearward beam cutters; and, (d) displacing the forward and rearward beam cutters in second and third directions, respectively. The displacement of the beam cutters is transverse to the first direction in a plane parallel to the flat plane defined by the conveyor belt. The third direction is generally opposite the second direction, such that the forward and rearward beam cutters always move in opposite directions at the same speed. One forward beam cutter acts in concert with one rearward beam cutter to cut repetitive patterns through the material during a single pass.

In one preferred embodiment of the invention, the displacement of the forward and rearward beam cutters is controlled to cut a repetitive pattern of circular shapes in a row. In this embodiment, the first forward beam cutter cuts the first sides of the circles and the first rearward beam cutter cuts the second sides of the circles.

Alternatively, the forward and rearward beam cutters are displaced to cut the circular shapes by cutting a series of linked S shapes with the first forward beam cutter while the first rearward beam cutter cuts mirror image linked S shapes over the S shapes cut by the forward beam cutter. Multiple rows of circles may be cut side by side by a series of forward beam cutters and rearward beam cutters.

In another alternate embodiment of the invention a second set of beam cutter streams is generated and the beam cutters are displaced to cut pie or wedge shapes as the material moves beneath them.

In still another alternate embodiment of the invention, a stationary beam cutter is used to cut a straight path in combination with a first set of beam cutters that cut mirror-image paths.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
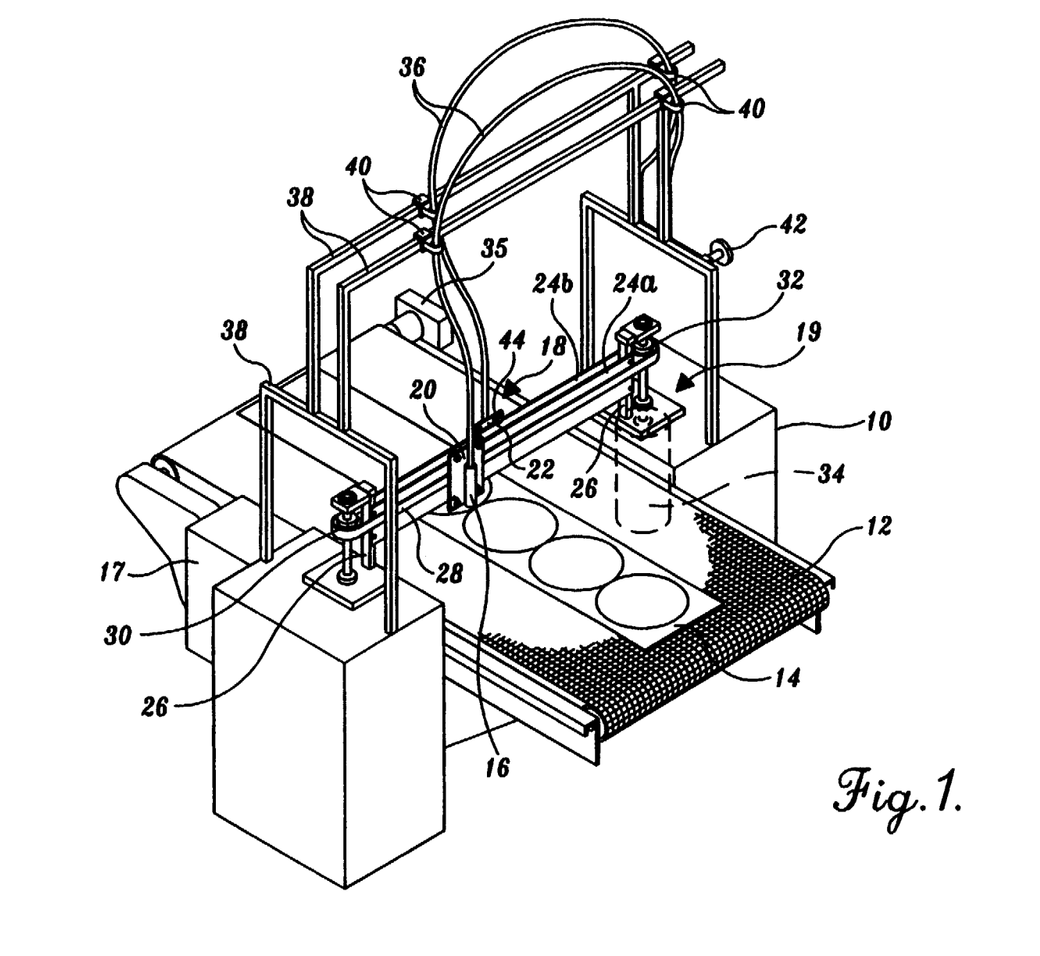
FIG. 1 is an isometric view of a preferred embodiment of the invention illustrating a drive mechanism with two fluid jet cutters working in concert to create a row of circles.

A first preferred embodiment of the present invention is illustrated in FIG. 1. The beam cutter includes a frame 10, conveyor belt 12, and forward and rearward cutters 16, 18. The beam cutters may be fluid jet cutters, laser beam cutters, or may utilize other energy beams to cut the material. Preferably, fluid jet cutters are used with water as the operative fluid. Frame 10, generally in the shape of a parallelepiped, supports the elements of the fluid jet cutter. Conveyor belt 12 is disposed transversely to frame 10 in a plane parallel to the top surface of frame 10. Conveyor belt 12 is oriented 90° from the longitudinal axis of frame 10, but could also be oriented at other angles thereto. Conveyor belt 12 is driven at a selected constant speed by a drive motor (not shown) located in motor housing 17. The drive motor can be composed with a servomotor to thus adjust the speed of the belt. A strip of dough or other material 14 is carried on conveyor belt 12 to be cut into predefined patterns with cutters 16, 18.

The movement of cutters 16, 18 is controlled by a first drive mechanism 19. Drive mechanism 19 includes a forward carriage 20, a rearward carriage 22, guide tracks 24, support posts 26, an endless drive belt 28, an idler spindle 30, a drive spindle 32, and servomotor 34. Forward cutter 16 is carried on forward carriage 20. Rearward cutter 18 is carried by rearward carriage 22. Carriages 20, 22 ride on guide tracks 24a and 24b which are oriented parallel to the longitudinal axis of frame 10 and positioned above the frame. Guide tracks 24a and 24b are composed of rectangular steel plates mounted on support posts 26 at an elevation above the top of conveyor belt 12 such that carriages 20, 22 may ride back and forth above conveyor belt 12 in left and right directions (as shown in FIG. 1) transversely to the direction of movement of conveyor belt 12. A forward guide track 24a carries forward carriage 20 while a rearward guide track 24b, oriented parallel to forward guide track 24a, carries rearward carriage 22. Guide tracks 24a and 24b are supported at their ends by posts 26. Posts 26 are in turn secured to frame 10 adjacent the sides of conveyor belt 12.

Movement of carriages 20, 22 is accomplished by an endless drive belt 28 which is disposed in a plane parallel to the plane defined by conveyor belt 12. Drive belt 28 rides around an idler spindle 30 on the right side (as shown in FIG. 1) of conveyor belt 12 and a drive spindle 32 on the left side (as shown in FIG. 1) of conveyor belt 12. Spindles 30, 32 are on the outsides of support posts 26 and have diameters greater than the distance between guide tracks 24 such that drive belt 28 does not come in contact with guide tracks 24a and 24b but extends adjacent and parallel to guide tracks 24a and 24b. A rearward span of drive belt 28 is disposed rearwardly adjacent the rearward guide track 24b while a forward span of drive belt 28 is disposed forwardly adjacent the forward guide track 24a. Drive spindle 32, as well as idler spindle 30, have axes of rotation which are parallel to support posts 26 such that all four are aligned in the same vertical plane disposed perpendicularly to the plane of conveyor belt 12. Spindles 30, 32 have gear teeth which engage teeth on the inner surface of drive belt 28. Drive spindle 32 is powered by a servomotor 34 secured within frame 10 beneath drive spindle 32.

Servomotor 34 is computer controlled to move drive belt 28 so that cutters 16, 18 have defined paths to cut shapes, such as that shown in FIG. 1 Since one drive belt 28 is used to control the movement of both cutters 16. 18, it will be appreciated that movement of forward cutter 16 in one direction is accompanied by movement of rearward cutter 18 in an opposite direction at the same speed. Because the two cutters are disposed on opposite sides of the same belt, synchronization of the cutters is accomplished and shapes may be easily cut into the material on conveyor belt 12 with only minor adjustments to either the speed of conveyor belt 12 or the speed of servomotor 34. These adjustments will not cause changes in the registration of one cutter relative to the other but only in the elongation or shortening of the cut. For example, if conveyor belt 12 had an excessive speed the circles would turn into ovals although each side of the ovals cut by the individual cutters 16, 18 would still join properly.

Preferably, the speed of conveyor belt 12 is indicated by a belt encoder 35. Belt encoder 35 is attached to the upstream roller of conveyor belt 12 to detect the speed of conveyor belt 12. This speed is indicated to the computer so that the speed of servomotor 34, which controls movement of cutters 16, 18, can be controlled to cut the proper, nondistorted shapes. Alternatively, the speed of drive motor 17 can be controlled to accomplish the same end.

Fluid supply lines 36 are connected to the top of cutters 16, 18 to supply the high-pressure fluid which flows through cutters 16, 18. Fluid supply lines 36 are supported by an overhead fluid line support frame 38 which is secured to frame 10 near support posts 26. Fluid line support frame 38 rises vertically from both sides of frame 10, has a 90 degree turn, and runs horizontally over drive mechanism 19. Fluid line support frame 38 includes four fluid line sliders 40 two of which are slidably attached to each fluid supply line 36. Fluid line sliders 40 slide along the frame 38 as the cutters 16, 18 move to the left or right with the drive belt 28. Fluid supply lines 36 are supplied with fluid through fluid valve 42 which is connected to a main source of high-pressure fluid.

In use high-pressure fluid, such as water, is pumped through fluid supply lines 36 into forward and rearward cutters 16, 18 such that water jet streams are created that are directed downwardly, perpendicular to the plane defined by conveyor belt 12. These fluid streams are used to cut shapes in dough 14 or other material that is moved along on conveyor belt 12. The high-pressure water jet streams cut through dough 14 and then pass downwardly through the open grids of conveyor belt 12 where the water is collected for reuse or disposal. As explained above, servomotor 34 in combination with drive spindles 30, 32 and drive belt 28 move carriages 20, 22 along guide tracks 24a and 24b such that cutters 16, 18 are moved in concert to cut the shapes desired. A programmable logic controller or computer is used to change the speed and direction of servomotor 34, such that the desired shapes are cut as the dough moves along on conveyor belt 12, preferably at a constant speed.

Figure 2:
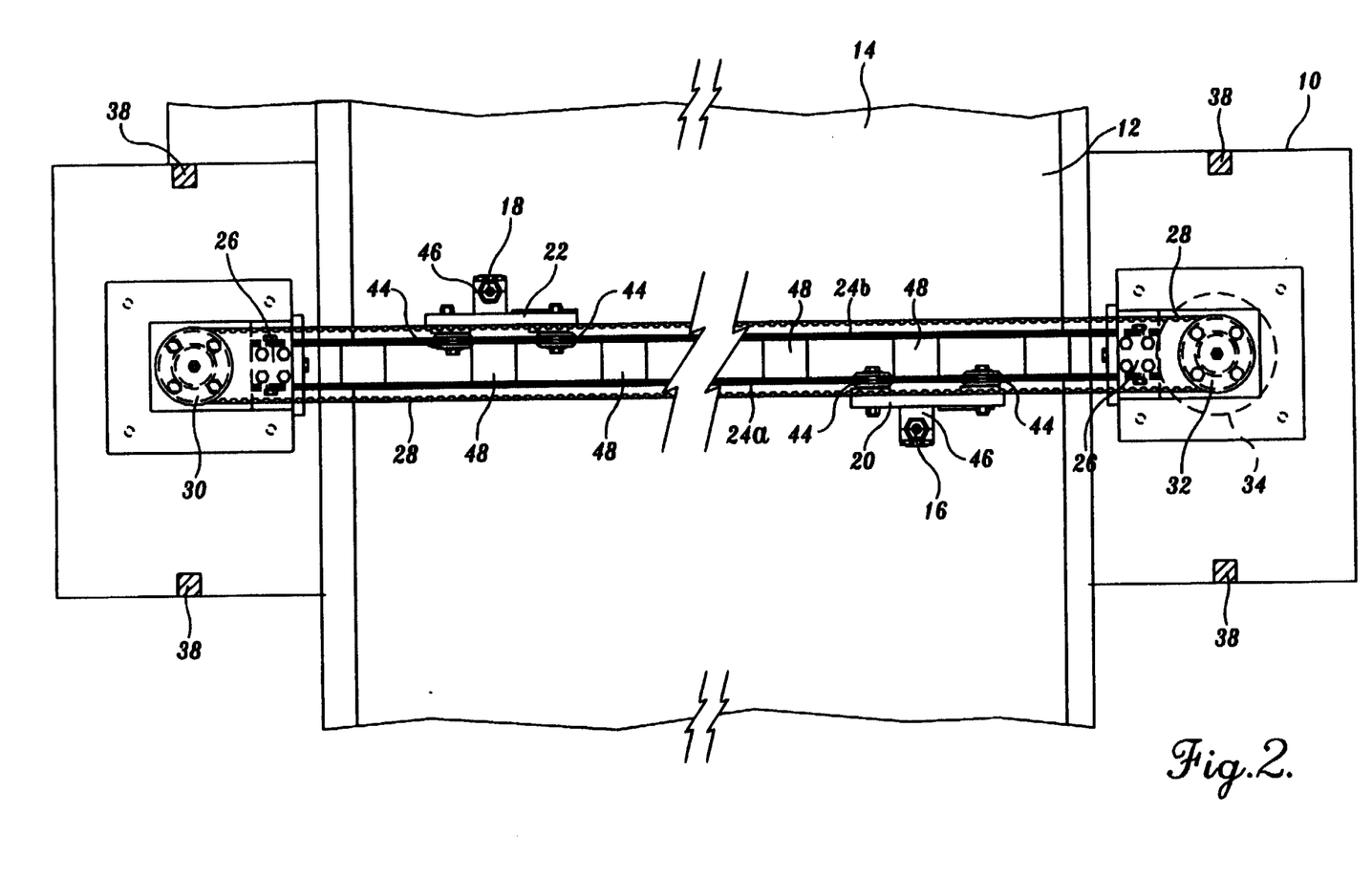
FIG. 2 is a plan view showing the details of the drive mechanism.

Referring now to FIG. 2, the details of drive mechanism 19 will be discussed. As explained above, drive mechanism 19 includes forward and rearward carriages 20, 22. Forward and rearward carriages 20, 22 ride on guide tracks 24a and 24b which extend from support posts 26 to provide two parallel tracks to guide the directional movement and accurate positioning of cutters 16, 18. Guide tracks 24a and 24b have track spacers 48 at regular intervals between the two tracks to maintain their parallel orientation to one another and to drive belt 28. Four carriage wheels 44 are rotatably mounted on each carriage 20, 22 to guide the carriages along the tracks. Each carriage wheel 44 rotates about an axis perpendicular to guide tracks 24a and 24b. Two carriage wheels 44 of each carriage 20, 22 ride along a top edge of a guide track while two carriage wheels also ride along the bottom edge of the guide tracks 24a and 24b. Each of the carriage wheels 44 has a central groove about its perimeter to engage the edge (top or bottom) of a guide track. Thus, guide tracks 24a and 24b ride within the grooves.

Drive belt 28 is clamped or otherwise affixed to forward and rearward carriages 20, 22. Forward carriage 20 moves with the movement of the forward span of drive belt 28 and likewise rearward carriage 22 moves with the movement of the rearward span of drive belt 28. Thus, when drive belt 28 is moved by servomotor 34, carriages 20, 22 are also moved the same distance.

Forward and rearward carriages 20, 22 secure forward and rearward cutters 16, 18, respectively, with cutter supports 46 which extend perpendicularly from the outward faces of carriages 20, 22 and act as receptacles for forward and rearward cutters 16, 18. Each cutter support has a vertically bored hole into which the cutters are closely received such that the cutters are held in a vertical orientation over conveyor belt 12.

Figure 3:
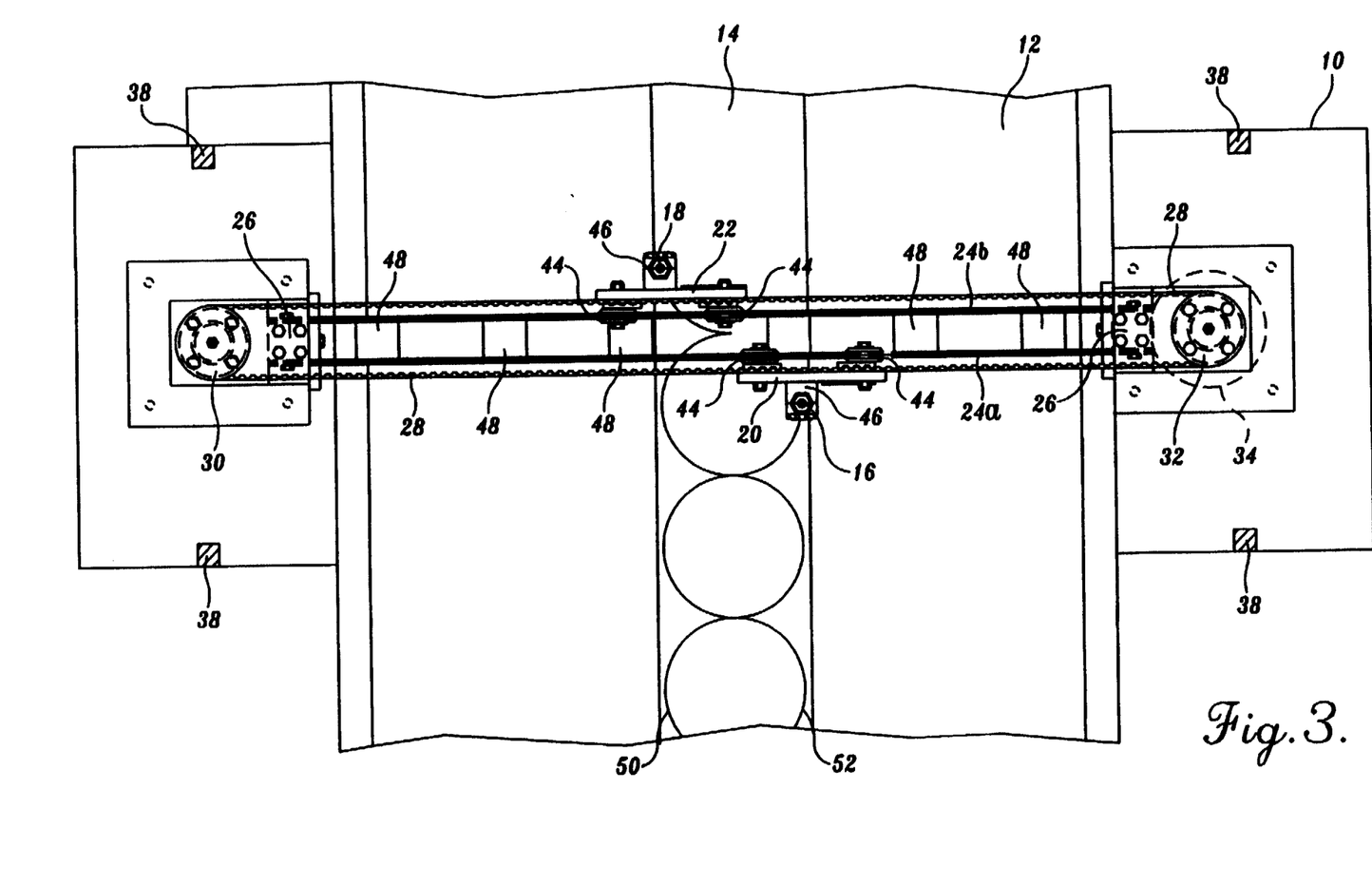
FIG. 3 is a plan view of an embodiment of the invention cutting circles by cutting one side with each jet cutter.

Referring now to FIG. 3, a method of using the apparatus discussed above to cut circle shapes is shown. A strip of material, such as dough 14, to be cut is placed on conveyor belt 12. Conveyor belt 12 advances dough 14 beneath forward and rearward cutters 16, 18. Cutters 16, 18 shoot high pressure streams of water downwardly through dough 14 and conveyor belt 12 to effectively cut dough 14 with little or no waste and no contamination of dough 14. As conveyor belt 12 moves dough 14 beneath cutters 16, 18, servomotor 34 moves drive belt 28 on spindles 30, 32 back and forth in directions transversely to the direction of movement of the conveyor belt 12. Since drive belt 28 is positively attached to forward and rearward carriages 20, 22, the carriages also move. The proper orientation of carriages 20, 22, and thus cutters 16, 18, is maintained by guide tracks 24a and 24b on which carriages 20, 22 are slidably engaged. This combination maintains the vertical orientation of forward and rearward cutters 16, 18, such that the high pressure stream of water is always directed downwardly direction through dough 14.

As dough 14 advances, rearward cutter 18 is controlled by servomotor 34 to cut the right side semi-circle pattern 50 in dough 14. Right side semi-circle pattern 50 is comprised of semi-circular segments which are linked end to end as rearward cutter 18 moves in the right and leer directions. Since forward cutter 16 is connected to the same endless drive belt 28, it also moves in the left and right directions opposite to the movement of rearward cutter 18. Thus, forward cutter 16 cuts lea side semicircle pattern 52 which completes the semi-circular segments made by rearward cutter 18. Since forward and rearward cutters 16, 18 are connected to the same endless drive belt, the speed of operation will not effect the matching up of the semicircular segments to form complete circles. The diameter of the circles is determined by the distance along the length of conveyor belt 12 between rearward cutter 18 and forward cutter 16. As seen in FIG. 3, as rearward cutter 18 is at its outwardmost position in forming a semi-circular segment on the right, forward cutter 16 is also at an outwardmost position in forming a semi-circular segment on the left to mirror the previously cut semi-circle on the right. As rearward cutter 18 moves inwardly so does forward cutter 16 such that complete circles are formed when the inward most position of forward cutter 16 reaches the previously cut inward side of the circle segment cut by rearward cutter 18.

Figure 4:
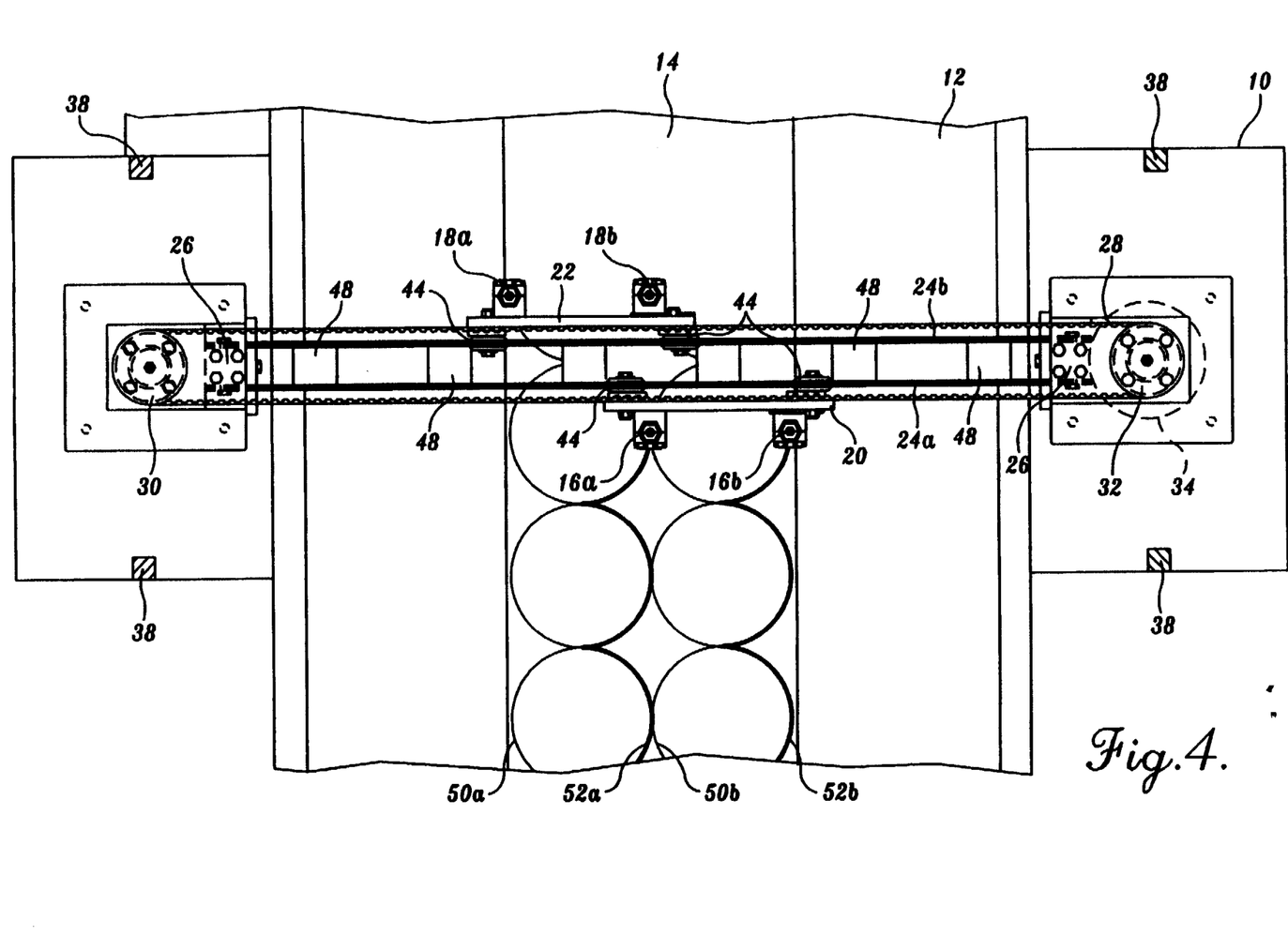
FIG. 4 is a plan view of an embodiment of the invention shown cutting two rows of circles side by side.
Figure 5:
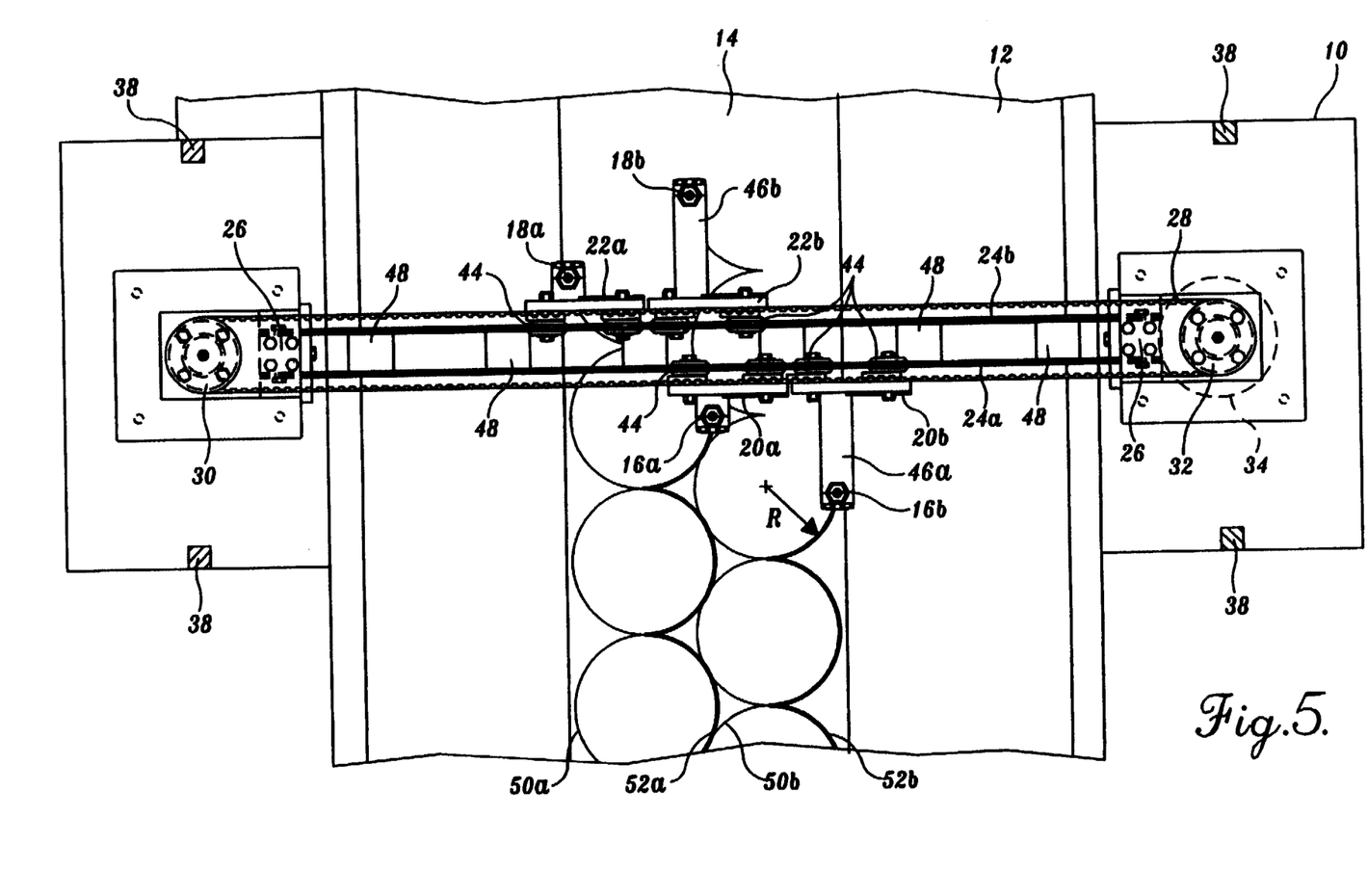
FIG. 5 is a plan view of an embodiment of the invention showing two rows being cut with the second row shifted relative to the first row such that less material is wasted.

As seen in FIG. 4, multiple rows of circles can be cut side by side using the present invention. For each row of circles, a pair of forward and rearward cutters 16, 18 act in concert to create each side 50a, 50b, 52a, and 52b of each row. Two rows of circles are shown in FIG. 4, however, those skilled in the art will appreciate that many more rows can be cut by simply adding forward and rearward pairs of cutters. All the forward cutters 16 may be mounted on the same forward carriage 20, which is elongated, or each may have its own carriage mechanism (as seen in FIG. 5) as long as all are connected to the forward span of drive belt 28. The same applies to rearward cutters 18.

FIG. 5 illustrates the cutting of multiple rows of circles which are shifted relative to each other to diminish waste. To accomplish the shift, cutter support 46a of the left forward carriage 20b is elongated such that leer forward cutter 16b is positioned a distance of one radius R forward of right forward cutter 16a on right forward carriage 20a ("forward" being defined as the direction of movement of conveyor belt 12, "rearward" being in a direction opposite forward and "right" and "left" defined as if facing forward). Likewise, left rearward carriage 22b has an extended cutter support 46b to position rearward cutter 18b a distance of one radius R behind rearward cutter 18a on right rearward carriage 22a. This extension of the rearward cutter support and the forward cutter support of one set of cutters 16b, 18b allows the cutting of the two rows to be shifted relative to each other by a radius such that they can nest closely together without cutting over one another. Note that the left cutters 16b, 18b are positioned a distance of two circle diameters apart while the right cutters 16a, 18a are positioned one diameter apart.

Figure 6:
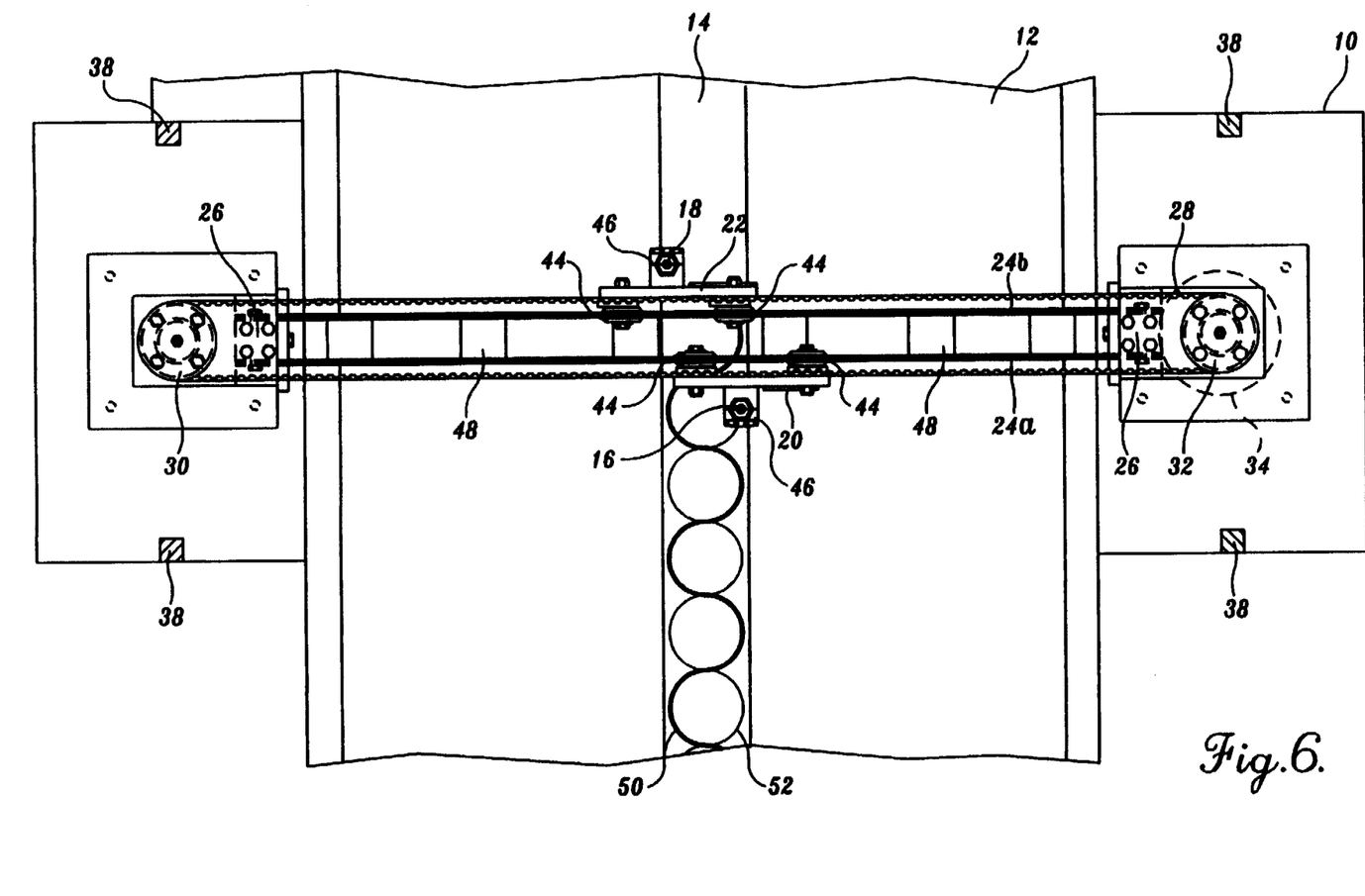
FIG. 6 is a plan view of an embodiment of the invention showing a row of circles being cut by each fluid jet cutter cutting linked "S" shapes.

An alternate method of cutting circular shapes is illustrated in FIG. 6. In this embodiment, rearward cutter 18 moves to the left and to the right to cut linked or continuous S shapes. Forward cutter 16 cuts mirror image S shapes over the S shapes cut by rearward cutter 18 as dough 14 passes beneath it. By using this method, the distance between forward cutter 16 and rearward cutter 18 is equal to two circle diameters. The same cutters could be used to cut this pattern of circles as were used to cut those shown in FIG. 3 by changing the computer logic used to control servomotor 34.

Multiple rows of circles could also be cut by using this method just as was done with the method described above in conjunction with FIGS. 4 and 5.

Figure 7:
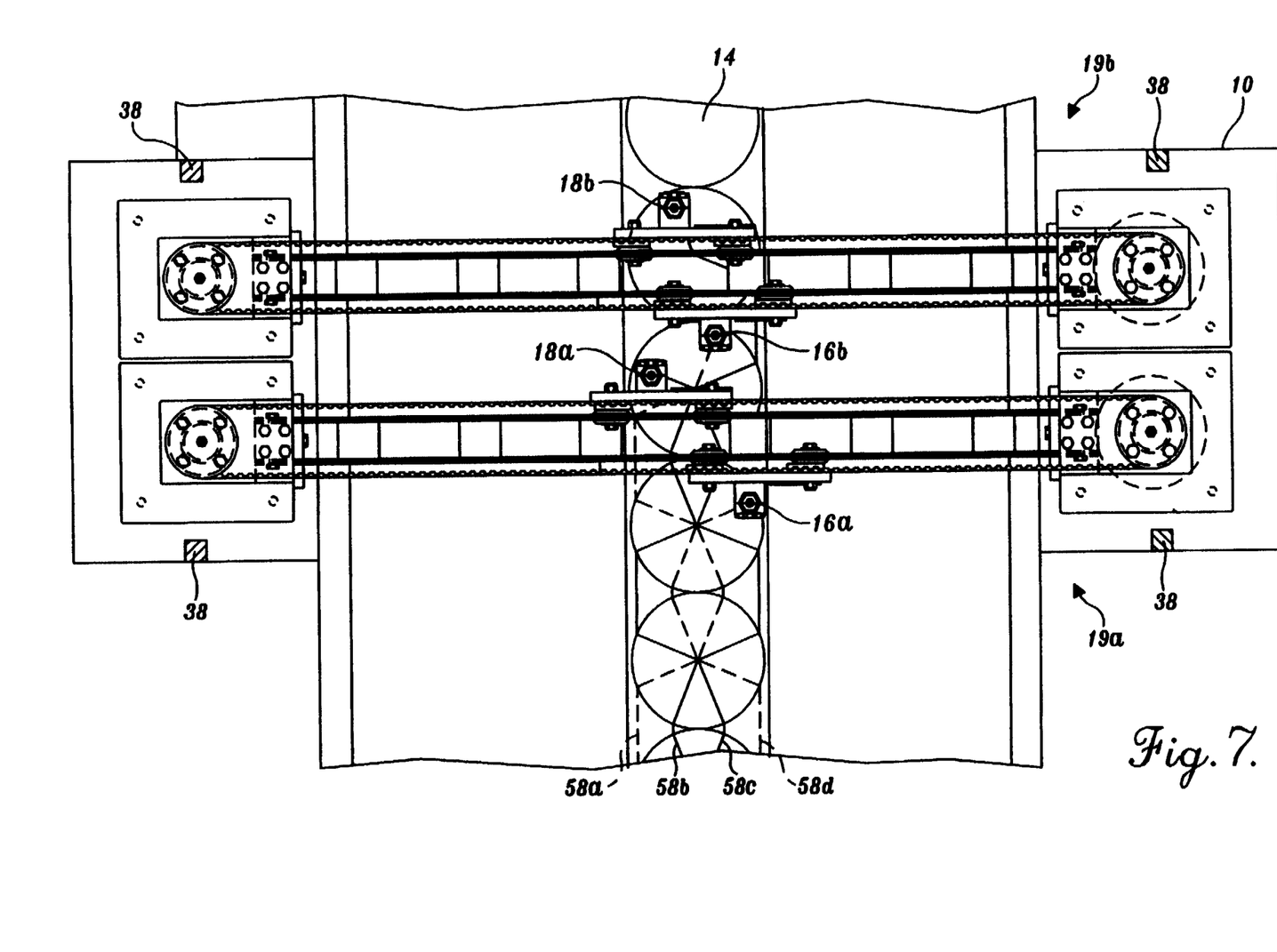
FIG. 7 is a plan view of an alternate embodiment of the invention with two sets of drive belts and fluid jet cutters cutting pie shapes from dough with circles already cut.

An apparatus for cutting pie shapes or wedges is illustrated in FIG. 7. To cut a circular item 14 into eight wedge segments, two drive mechanisms 19 may be used, each cutting lines through the circles to form eight wedges or pie segments as shown in FIG. 7. Drive mechanisms 19 are positioned side by side along conveyor belt 12. Rearward cutter 18b of rearward drive mechanism 19b cuts a pattern in item 14 as the item passes under the rear cutter while, one diameter away, forward cutter 16b of rearward drive mechanism 19b cuts a shifted mirror image. Lines 58a and 58b illustrate the pattern of cuts made by forward cutter 16b and rearward cutter 18b, respectively. It should be noted that the mirror image cut 58b is actually shifted by one diameter from cut 58a since that is the spacing between forward cutter 16b and rearward cutter 18b. Rearward cutter 18a and forward cutter 16a on forward drive mechanism 19a cut similar patterns defined by lines 58c and 58d, respectively. The pattern of lines cut by forward cutter 16a and rearward cutter 18a actually mirror the lines cut by forward cutter 16b and rearward cutter 18b such that eight wedge-shaped segments are formed within each circle.

As discussed above, additional cutters could be positioned along side those shown in FIG. 7 such that multiple rows of circles could be cut into wedge shapes as was done with the single row illustrated in FIG. 7. The circular shapes which are fed beneath the drive mechanisms to cut the pie-shaped segments may be cut by a third drive mechanism positioned next to either of (or even between) drive mechanisms 19 discussed in conjunction with FIG. 7 such that all cutting is done with one pass along conveyor belt 12.

It should be noted that wedges can be cut in items that are already circular and may not be simply part of a strip of material. Examples include pies, pizzas, and cakes. The device of the present invention is not limited to cutting dough (see FIG. 8).

Figure 8:
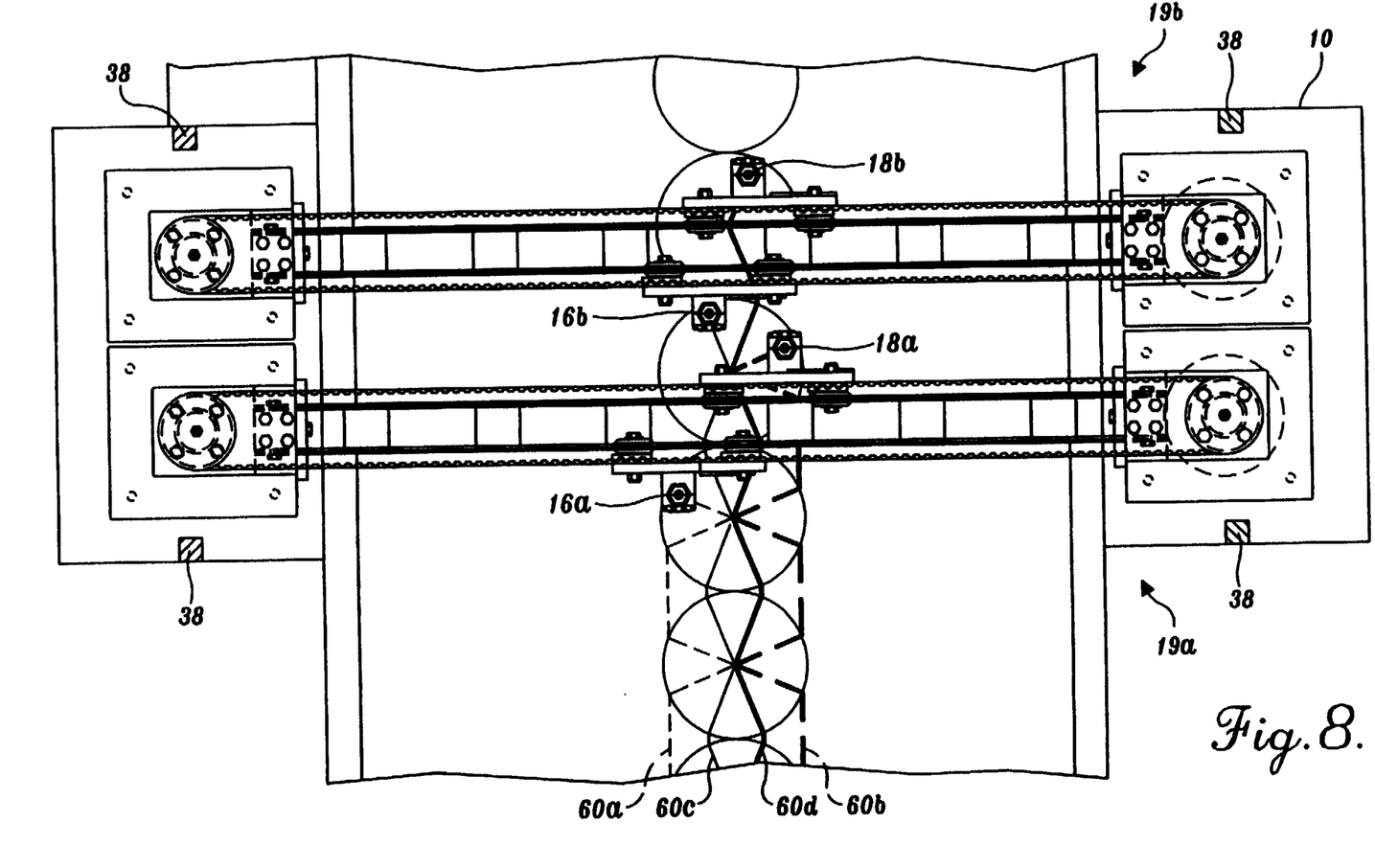
FIG. 8 is a plan view similar to that of FIG. 7 except that different cutter paths for cutting the pie shapes are employed.

Another method of cutting pie- or wedge-shaped segments with two independent drive mechanisms, each having forward and rearward cutters 16, 18, is illustrated in FIG. 8. In this embodiment, one set of cutters cuts mirror image lines 60a and 60b which are the widest cuts, while a second set of cutters cuts lines 60c and 60d, the narrowly spaced set of lines. This is done with cooperating movements of forward and rearward cutters 16, 18 in a manner similar to that used to cut the circle pattern discussed with FIG. 3. Narrowly spaced lines 60c and 60d are cut by rearward cutter 18b cutting on the left while forward cutter 16b cuts a mirror image on the right. A similar method is used to cut widely-spaced lines 60a and 60b.

Figure 9:
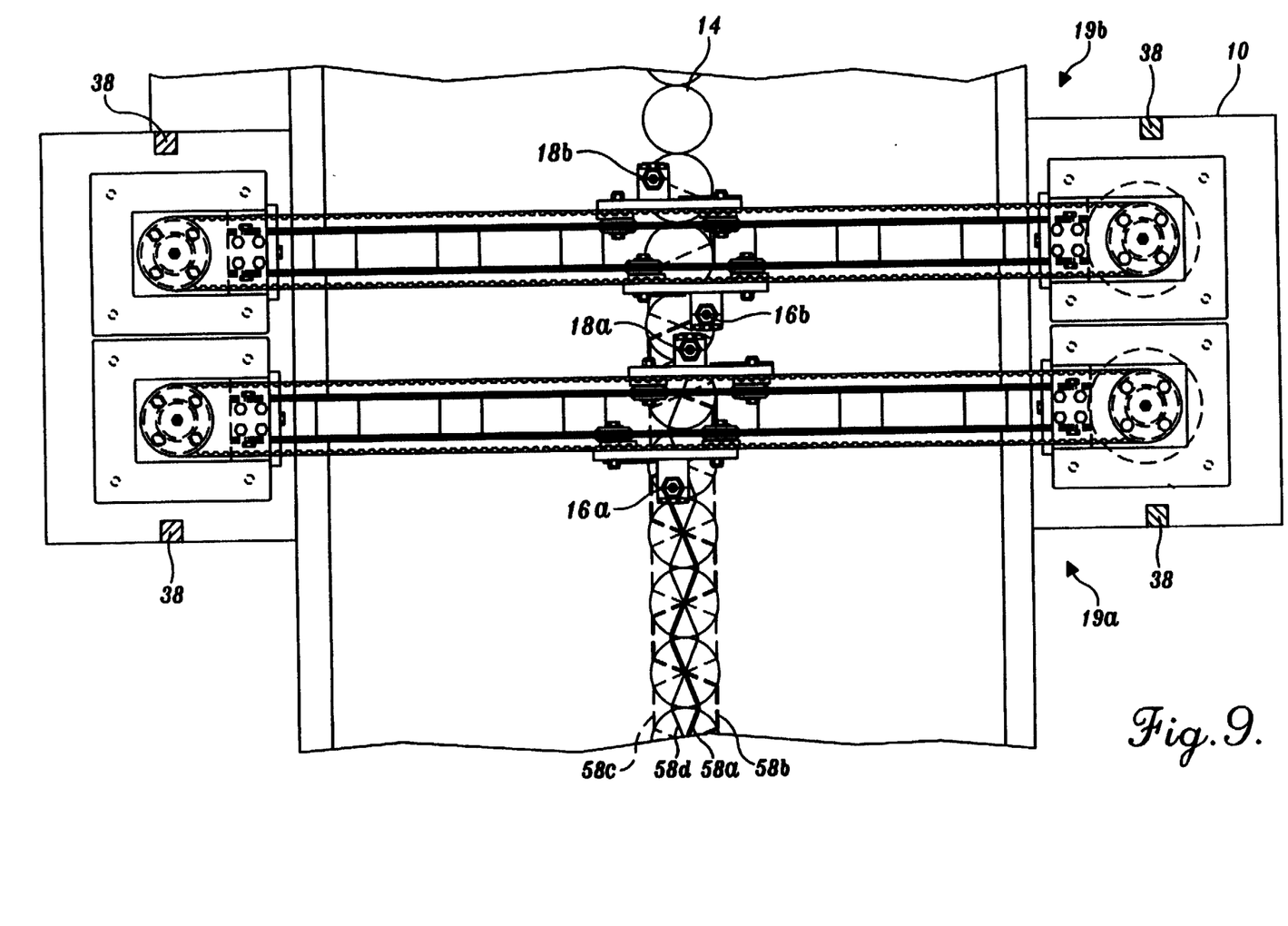
FIG. 9 is a plan view similar to that of FIG. 8 except that different cutter paths are employed to cut smaller circles.

Lines 60a-d could also be cut on circles one-half the diameter of those shown in FIG. 8 by using a method similar to that discussed in conjunction with FIG. 6 (continuous "S"-shapes). FIG. 9 illustrates this method. Each cutter 16, 18 cuts slightly-modified zigzag patterns.

Referring to FIG. 9, a cutter apparatus identical to that illustrated in FIG. 8 may be used. The apparatus 10 includes forward and rearward drive mechanisms 19a, 19b, side-by-side. Rearward drive mechanism 19b includes forward and rearward cutters 16b, 18b that cut overlapping lines 58b, 58c. Each line 58b, 58c cuts entirely across the circular shapes 14 in a zigzag pattern, the lines 58b, 58c crossing at the centers of the circular shapes 14.

Forward drive mechanism 19a includes forward and rearward cutters 16a, 18a that cut overlapping lines 58a, 58d that are similar to those cut by cutters 16b, 18b except that lines 58a, 58d cut a wider pattern such that eight similarly-shaped wedges are cut by their combination with narrowly cut lines 58b, 58c.

Figure 10:
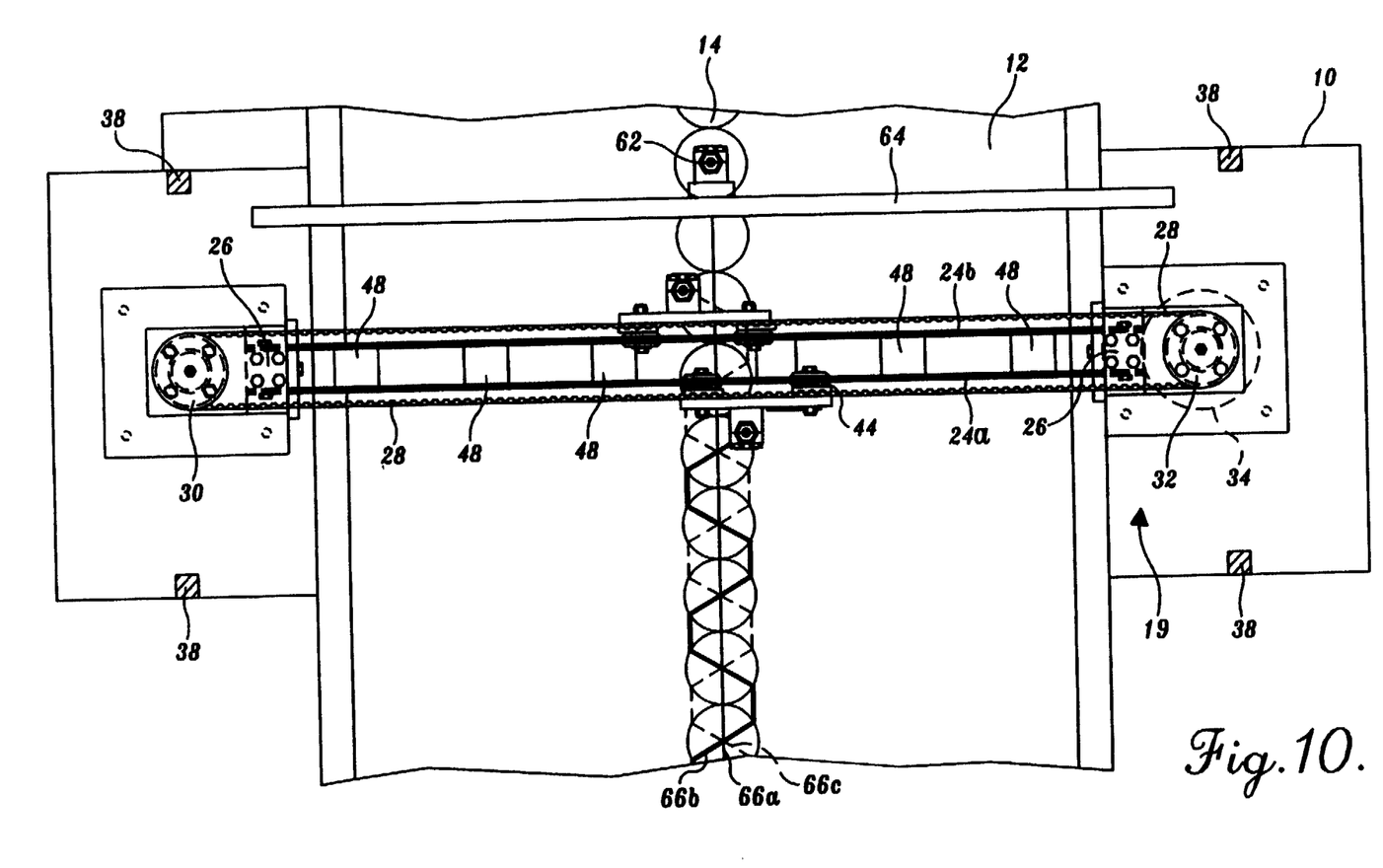
FIG. 10 is a plan view of an embodiment of the invention showing two cutters on an endless belt and one stationary cutter employed to cut wedge shapes.

Referring to FIG. 10, an embodiment of the present invention is illustrated that divides circular shapes 14 into six wedges. To carry out such cutting, a stationary jet 62 is positioned rearward of a drive mechanism 19. Stationary jet 62 is held over conveyor belt 12 with a stationary jet framework 64 attached to frame 10 on both sides of conveyor belt 12. As circular shapes 14 pass beneath stationary jet 62, the jet simply cuts a straight line 66a through the middles of circular shapes 14. Drive mechanism 19, with cutters 16, 18, cuts zigzag patterns 66b, 66c similar to those described above with reference to FIG. 9. In this manner, wedges of equal or differing sizes may be cut.

Figure 11:
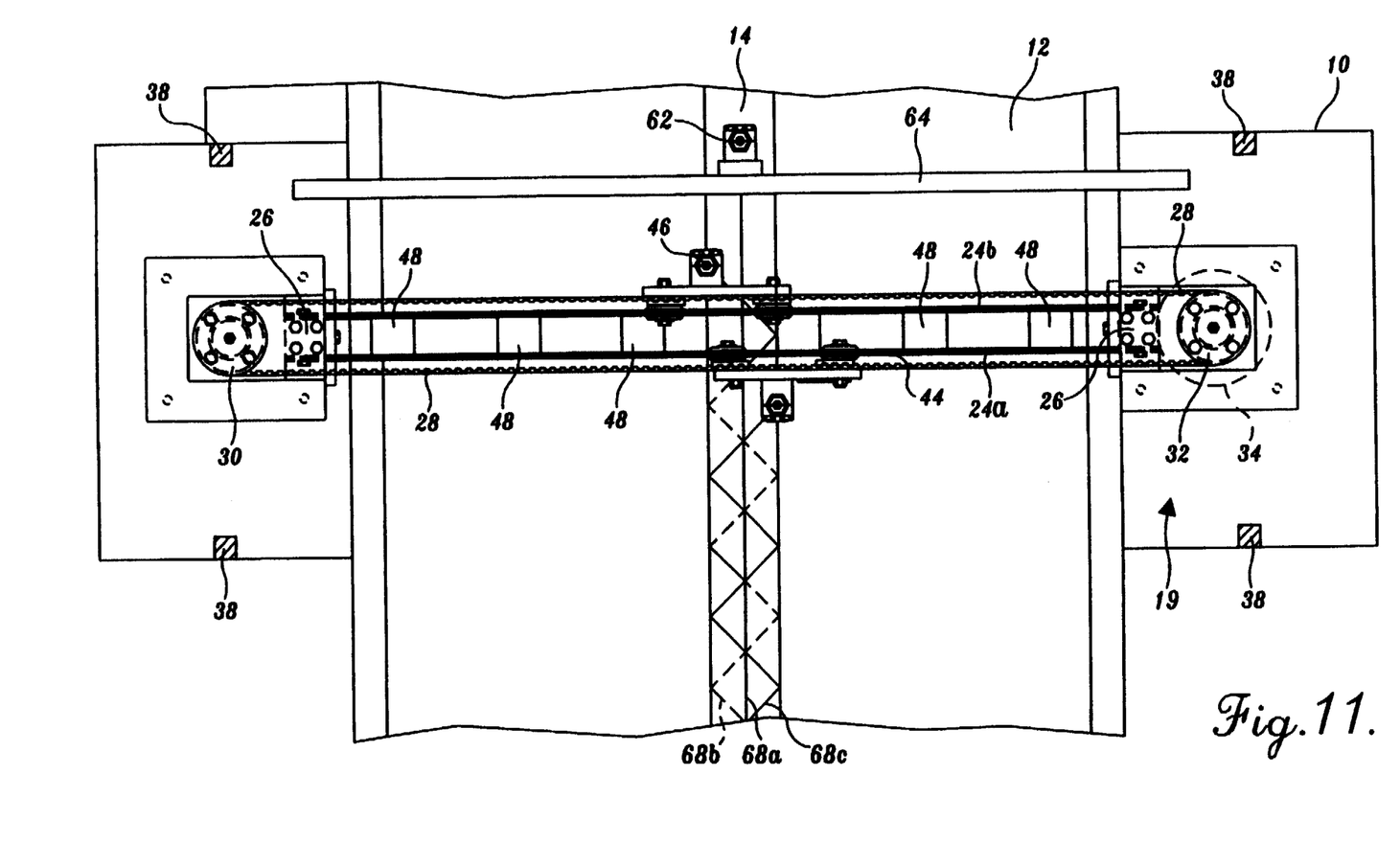
FIG. 11 is a plan view similar to that of FIG. 10 except that triangular shapes are being cut from a strip of material.

FIG. 11 illustrates an apparatus similar to that discussed with FIG. 10. However, the apparatus is controlled to cut triangular shapes such as might be used for rolling croissants. Each of cutters 16, 18 cuts a zigzag path 68b, 68c on a strip of material. Cutters 16, 18 by themselves cut squares that are rotated by 45 degrees. Because the squares are rotated, triangles are also formed between the squares and the sides of the strip of material 14. The sides of the strip of material 14 forms the hypotenuse of these triangles. The stationary cutter 62 cuts a straight path 68a through the middles of the strip of material 14 to form the hypotenuses of the triangles formed from the squares.

While preferred embodiments of the invention have been illustrated and described, it will be appreciated that various changes can be made therein without departing from the spirit and scope of the invention.

The embodiments of the invention in which an exclusive property or privilege is claimed are defined as follows:

1. An apparatus for cutting a predetermined repetitive pattern in at least one piece of material, comprising:
   (a) a conveyor for advancing the material;
   (b) a first drive mechanism disposed above the conveyor, wherein the first drive mechanism includes at least two spindles and a first endless drive belt trained on the spindles such that the drive belt moves relative to the conveyor in a direction transverse to the direction of movement of the conveyor, the first drive belt defining a forward span and a rearward span;
   (c) a first beam cutter attached to the forward span of the first drive belt so as to move with the forward span of the first drive belt; and
   (d) a second beam cutter attached to the rearward span of the first drive belt so as to move with the rearward span of the first drive belt, the second beam cutter being offset from the first beam cutter in a direction transverse to the direction of movement of the first beam cutter such that the cutters can pass each other transversely on the respective spans of the first drive belt.

2. The apparatus of claim 1, wherein the drive mechanism further comprises:
   (a) a first track disposed adjacent and substantially parallel to the forward span of the first drive belt;
   (b) a first carriage attached to the forward span of the first drive belt to ride along the first track, the first carriage carrying the first beam cutter:
   (c) a second track disposed adjacent and substantially parallel to the rearward span of the first drive belt; and
   (d) a second carriage attached to the rearward span of the first drive to ride along the second track, the second carriage carrying the second beam cutter.

3. The apparatus of claim 2, wherein the drive mechanism further comprises drive means for moving the first drive belt along with the attached first and second carriages and first and second beam cutters.

4. The apparatus of claim 3, wherein the drive means comprises a servomotor that drives at least one of the spindles coupled to the drive belt.

5. The apparatus of claim 3, wherein the beam cutters comprise fluid jet cutters, the apparatus further comprising:
   (a) a first high pressure fluid line attached to the first fluid jet cutter; and
   (b) a second high pressure fluid line attached to the second fluid jet cutter.

6. The apparatus of claim 3, further comprising:
   (a) a third beam cutter attached to the forward span of the first drive belt so as to move with the forward span of the first drive belt; and
   (b) a fourth beam cutter attached to the rearward span of the first drive belt so as to move with the rearward span of the first drive belt.

7. The apparatus of claim 6, wherein the third beam cutter is attached to the forward span of the first drive belt through mounting on the first carriage, the third beam cutter being disposed adjacent to the first beam cutter, and wherein the fourth beam cutter is attached to the rearward span of the first drive belt through mounting on the second carriage, the fourth beam cutter being disposed adjacent to the second beam cutter.

8. The apparatus of claim 6, further comprising:
   (a) a third carriage attached to the forward span of the first drive belt to ride along the first track, the third carriage carrying the third beam cutter; and
   (b) a fourth carriage attached to the rearward span of the first drive belt to ride along the second track, the fourth carriage carrying the fourth beam cutter.

9. The apparatus of claim 1, wherein the angle between the direction of movement of the conveyor and the direction of movement of the drive belt is approximately 90 degrees.

10. The apparatus of claim 1, further comprising:

(a) a third beam cutter attached to the forward span of the first drive belt so as to move with the forward span of the first drive belt; and (b) a fourth beam cutter attached to the rearward span of the first drive belt so as to move with the rearward span of the first drive belt.

11. The apparatus of claim 1, wherein the movements of the first beam cutter and the second beam cutter are controlled by the first drive mechanism so that the first beam cutter cuts a repetitive pattern on the material while the second beam cutter cuts a mirror-image pattern on the material.

12. The apparatus of claim 11, wherein the first beam cutter cuts a series of semicircles while the second beam cutter cuts mirror-image semicircles so that complete circles are cut in the material.

13. The apparatus of claim 11, wherein the first and second beam cutters cooperate to cut wedges in the material.

14. The apparatus of claim 11, wherein the first beam cutter cuts linked continuous S-shapes while the second beam cutter cuts mirror-image S-shapes overlying the S-shapes cut by the first beam cutter so that complete circles are cut in the material.

15. The apparatus of claim 11, further comprising a stationary beam cutter disposed above the conveyor, wherein the first beam cutter cuts a zigzag path while the second beam cutter cuts a mirror image zigzag path overlying the path cut by the first beam cutter, the stationary beam cutter cutting a straight line through the material.

16. The apparatus of claim 1, further comprising:

(a) a second drive mechanism disposed above the conveyor belt, and alongside the first drive mechanism, the second drive mechanism including a second endless drive belt that moves transversely to the direction of movement of the conveyor belt, the second drive belt having a forward span and a rearward span;

(b) a third beam cutter attached to the forward span of the second drive belt so as to move with the forward span of the second drive belt; and (c) a fourth beam cutter attached to the rearward span of the second drive belt so as to move with the rearward span of the second drive belt.

17. The apparatus of claim 16, wherein the first and second beam cutters are controlled by the first drive mechanism so that the first beam cutter cuts a first repetitive pattern in the material while the second beam cutter cuts a first mirror-image pattern in the material, and wherein the third and fourth beam cutters are controlled by the second drive mechanism so that the third beam cutter cuts a second repetitive pattern in the material while the fourth beam cutter cuts a second mirror-image pattern in the material.

18. The apparatus of claim 17, wherein the first and second beam cutters cooperate to cut a first series of wedges in the material while the third and fourth beam cutters cooperate to cut a second series of wedges overlying the first series of wedges in the material.

19. An apparatus for cutting a predetermined repetitive pattern in at least one piece of material, comprising:

(a) a conveyor for advancing the material;

(b) a first drive mechanism disposed above the conveyor, wherein the first drive mechanism includes at least two spindles and a first endless drive belt trained on the spindles such that the drive belt moves relative to the conveyor in a direction transverse to the direction of movement of the conveyor, the first drive belt defining a forward span and a rearward span, the mechanism further including:

(i) a first track disposed adjacent and substantially parallel to the forward span of the first drive belt;

(ii) a first carriage attached to the forward span of the first drive belt to ride along the first track;

(iii) a second track disposed adjacent and substantially parallel to the rearward span of the first drive belt; and (iv) a second carriage attached to the rearward span of the first drive belt to ride along the second track;

(c) a first beam cutter attached to the first carriage to move with the forward span of the first drive belt;

(d) a second beam cutter attached to the second carriage to move with the rearward span of the first drive belt;

(e) a third beam cutter attached to the forward span of the first drive belt to move with the forward span of the first drive belt;

(f) a fourth beam cutter attached to the rearward span of the first drive belt to move with the rearward span of the first drive belt;

(g) a third carriage attached to the forward span of the first drive belt to ride along the first track, the third carriage carrying the third beam cutter; and (h) a fourth carriage attached to the rearward span of the first drive belt to ride along the second track, the fourth carriage carrying the fourth beam cutter.

* * * * *

UNITED STATES PATENT AND TRADEMARK OFFICE
CERTIFICATE OF CORRECTION

PATENT NO. : 5,365,816
DATED : November 22, 1994
INVENTOR(S) : N.A. Rudy

It is certified that error appears in the above-indentified patent and that said Letters Patent is hereby corrected as shown below:

| COLUMN | LINE | |
|--------|------|---|
| 7 | 16 | "leer" should read --left-- |
| 7 | 20 | "lea" should read --left-- |
| 7 | 54 | "leer" should read --left-- |

Signed and Sealed this

Fourteenth Day of March, 1995

BRUCE LEHMAN

*Attest:*

*Attesting Officer*     *Commissioner of Patents and Trademarks*